United States Patent Office 3,847,869
Patented Nov. 12, 1974

3,847,869
METHOD FOR PREPARING POLYETHERIMIDES
Frank J. Williams III, Scotia, N.Y., assignor to
General Electric Company
No Drawing. Filed Sept. 28, 1973, Ser. No. 401,865
Int. Cl. C08g 20/00, 25/00
U.S. Cl. 260—47 CZ
4 Claims

ABSTRACT OF THE DISCLOSURE

A method for preparing polyetherimides is provided involving the reaction between an organo bis(fluorophthalimide) and an alkali metal salt of a dihydric phenol in the presence of a dipolar aprotic organic solvent. The polyetherimides made by the afore-described method can be employed as injection molding compounds and to make wire coating formulations.

---

The present invention relates to a method for making polyetherimides involving the reaction of an alkali metal dihydric phenol and an organic bis(fluorophthalimide) in the presence of a dipolar aprotic solvent.

The polyetherimides which can be made in accordance with the practice of the present invention can have an intrinsic viscosity of from about 0.15 to 0.5 in dimethylformamide at 25° C. and consist essentially of chemically combined units of the formula, (I)

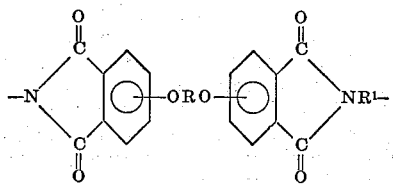

where R is a divalent aromatic organic radical having from about 6–30 carbon atoms and $R^1$ is a divalent organic radical selected from the class consisting of (a) aromatic hydrocarbon radicals having from 6–20 carbon atoms and halogenated derivatives thereof, (b) alkylene radicals, $C_{(1-8)}$ alkylene terminated polydiorganosiloxane, cyclo-alkylene radicals having from 3–20 carbon atoms, and (c) divalent radicals included by the formula

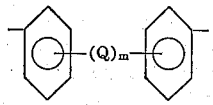

where Q is a member selected from the class consisting of

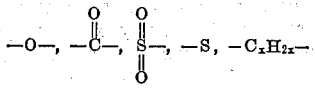

and $x$ is a whole number from 1 to 5 inclusive, and $m$ is 0 or 1.

Radicals included by R of formula I are more particularly (a) the following divalent organic radicals:

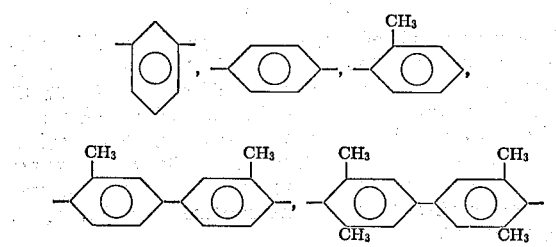

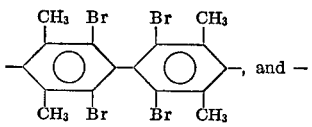

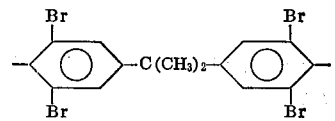

and (b) divalent organic radicals of the general formula

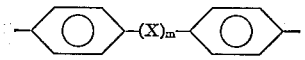

where X is a member selected from the class consisting of divalent radicals of the formulas

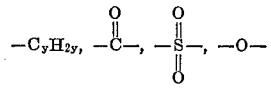

and —S—, where $m$ is 0 or 1, $y$ is a whole number from 1 to 5.

As shown in copending application of Darrell Heath and Joseph G. Wirth, Ser. No. 177,165, filed Sept. 1, 1971, and assigned to the same assignee of the present invention, polyetherimides consisting essentially of formula I units, can be made by effecting reaction between an alkali metal salt of a dihydric phenol of the formula, (II)          MOROM, where M is an alkali metal, such as sodium, potassium, lithium, etc. and R is as defined above and a bis(chlorophthalimide) in the presence of a dipolar aprotic organic solvent. Although valuable results are achieved with the aforementioned method of Ser. No. 177,165, the time required for effecting reaction between the bis(chlorophthalimide) and the dihydric phenol salt of formula I can be several days at temperatures up to about 100° C. In addition, the intrinsic viscosity of the resulting polymer is generally less than 0.2. Additional methods are constantly being sought to manufacture polyetherimide consisting essentially of formula I units.

The present invention is based on the discovery that if bisimide of the formula, (III)

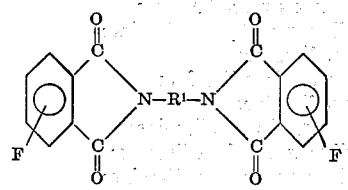

is employed in place of the above-described bis(chlorophthalimide) and reacted with the above-described alkali metal salt of dihydric phenol of formula II, that polyetherimide consisting essentially of formula I units can be made in considerably less time.

In addition, polyetherimide intrinsic viscosities can be obtained which are significantly higher than those achieved with bis(chlorophthalimide).

There is provided by the present invention a method for making polyetherimide consisting essentially of formula I units which comprises, (1) effecting reaction between substantially equal molar amounts of an alkali metal salt of a dihydric phenol of formula II and a bisimide of formula III in the presence of a dipolar aprotic organic solvent at a temperature up to 100° C., (2) thereafter recovering polyetherimide from the mixture of (1).

The bis(fluoroimide)s of formula III can be made by effecting reaction between about two moles of fluoro anhydride of the formula

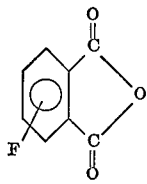

per mole of organic diamine of the formula, (IV)          $NH_2R^1NH_2$, where $R^1$ is as previously defined, in the presence of an organic solvent such as acetic acid. Included by the bis(fluoroimide)s of formula III are, for example, 4,4'-bis-(3 - fluorophthalimido)diphenylmethane; 4,4'-bis(4-fluorophthalimido)diphenylmethane; 4,4'-bis(3-fluorophthalimido)-diphenyl ether; 4,4 - bis(4-fluorophthalimido)diphenyl ether; 1,6-bis(3-fluorophthalimido)hexane; 1,6-bis(4-fluorophthalimido)hexane; etc. The above fluoro anhydrides are, for example, 3-fluorophthalic anhydride, 4-fluoro anhydride, etc.

There are included by the above organic diamines, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene;
2,6-diaminotoluene;
2,4-bis($\beta$-amino-t-butyl)toluene;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
bis(3-aminopropyl)tetramethyldisiloxane, etc.

Methods for making the alkali metal salts of the dihydric phenols are well known and include, for example, reaction of the bisphenol with sodium hydroxide using a toluene azeotrope to remove the water. Some of the dihydric phenols are, for example, 2,2-bis(2-hydroxyphenyl)propane;
2,4'-dihydroxydiphenylmethane;
bis(2-hydroxyphenyl)methane;
2,2-bis(4-hydroxyphenyl)propane, hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3',5,5'-tetramethylbiphenyl;
2,4-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

A preferred class of polyetherimides consisting essentially of units included by formula I are polymers having units of the formula, (V) 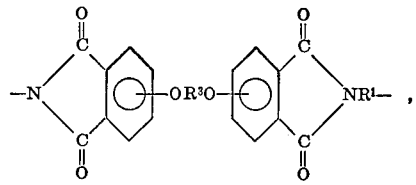

where $R^1$ is as previously defined, and $R^3$ is

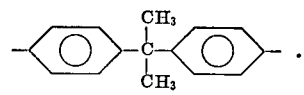

Reaction between the alkali metal salts of the dihydric phenol of formula II and the bis(fluoroimide) of formula III can be effected in the presence of a dipolar aprotic organic solvent at temperatures in the range of between 25° C. to 150° C. Suitable dipolar aprotic organic solvents are, for example, dimethylformamide, dimethylacetamide, dimethylsulfoxide, hexamethylphosphorous triamide, tetramethylene sulfone, etc.

Reaction between the bis(fluoroimide) and the alkali dihydric phenol is facilitated by agitating the reaction mixture to facilitate contact between the reactants. In addition to the above-described dipolar aprotic solvent, auxiliary solvents such as aromatic hydrocarbons, for example, toluene, benzene, xylene, etc. also can be utilized.

Reaction times can vary between 10 hours or more to as little as 2 hours or less depending upon such factors as the reactants utilized, the degree of agitation employed, the temperature at which the reaction is conducted, etc. At the termination of the reaction, an acid, such as acetic acid can be added to effect neutralization of the residual alkali metal ions. Additional solvent can be added to the mixture if desired. The resulting mixture then can be added to a precipitating solvent such as methanol to effect the separation and recovery of the polymer.

The polymer can be recovered by standard techniques such as filtration and the recovered polymer can then be washed with additional solvent such as chloroform and reprecipitated.

In order that those skilled in the art will be better able to practice the invention, the following examples are given by way of illustration and not by way of limitation. All parts are by weight.

Example 1

The sodium salt of bisphenol-A was prepared by stirring a mixture of 1.659 parts of a 50% aqueous sodium hydroxide solution and 2.363 parts of bisphenol-A with 15 parts of dimethylsulfoxide and 25 parts of toluene under a nitrogen atmosphere. The mixture was heated to reflux and water was azeotroped therefrom. After all the water had been removed, toluene was distilled until the pot temperature reached 160° C. The mixture was allowed to cool to 65° C.

Bis[4-(3 - fluorophthalimide)phenyl]methane was prepared by stirring a mixture of 10.04 parts of 3-fluorophthalic anhydride and 5.99 parts of methylene dianiline in 100 parts of glacial acetic acid under a nitrogen atmosphere. After the mixture was refluxed for 3 hours, it was cooled to room temperature. There was obtained a crude product which was collected and washed 3 times with diethylether. The crude product was then dried in a vacuum oven at 65° C. providing a 92% yield of a yellow crystalline material having a melting point of 233.5-234.5° C. Based on method of preparation and elemental analysis, Calc. for $C_{29}H_{16}O_4N_2F_2$: C, 70.4; H, 3.3; N, 5.7; Found: C, 70.2; H, 3.4; N, 5.5, the product was bis[4-(3-fluorophthalimide)phenyl]methane.

There was added to the above prepared sodium salt of bisphenol-A 5 parts of the above-described bis(fluorophthalimide) and 15 parts of anhydrous toluene. The resulting mixture was stirred for about 6 hours at a temperature of 70° C. The mixture was then allowed to cool to room temperature and about 0.1 part of acetic acid was added dropwise. The mixture was then diluted with 30 parts of a 1:1 dimethylsulfoxide toluene mixture. The resulting solution was then added dropwise to 600 parts of methanol. A product precipitated which was collected by filtration, dried and redissolved in chloroform, and reprecipitated in methanol. After drying in a 65° C. vacuum oven, there was obtained a product having an intrinsic viscosity in dimethylformamide of 0.277. Longer reaction time did not increase the intrinsic viscosity of the product. Based on method of preparation, the product was a polyetherimide consisting essentially of the following chemically combined units,

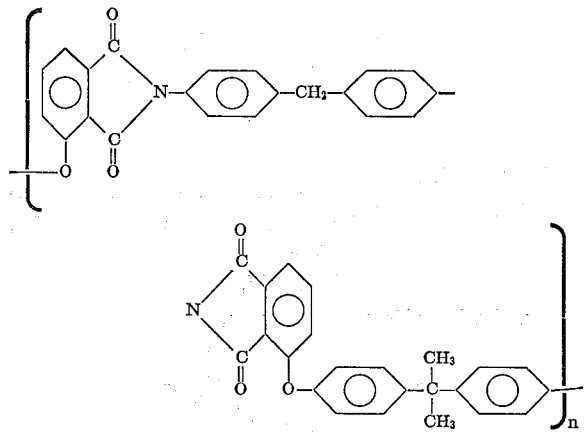

The above procedure was repeated except that in place of the bis(fluorophthalimide), there was utilized an equivalent amount of bis(chlorophthalimide). After 6 hours of reaction at 70° C., the intrinsic viscosity of the product was 0.099 in dimethylformamide. The reaction was allowed to proceed for 16 hours at 70° C. A product having an intrinsic viscosity of 0.154 in dimethylformamide was obtained.

Based on the above results one skilled in the art would conclude that the reaction between the bis(fluorophthalimide) was considerably faster with the sodium salt of bisphenol-A than the comparable bis(chlorophthalimide). In addition, the molecular weight of the polyetherimide resulting from the reaction of the bis(fluorophthalimide) was significantly higher than the molecular weight of the polyetherimide having chemically combined bis(chlorophthalimide) units.

Example 2

The sodium salt of bisphenol-A was prepared as described in Example 1 from the reaction of 1.554 parts of 50% aqueous sodium hydroxide solution and 2.215 parts of bisphenol-A in a dimethylsulfoxide toluene mixture. The mixture was cooled to 70° C. and 4.815 parts of bis-[4 - (3 - fluorophthalimide)phenyl]oxide was added, followed by rinsing with toluene.

The above [4 - (3-fluorophthalimide)phenyl]oxide was prepared by stirring a mixture of 10.71 parts of 3-fluorophthalic anhydride and 6.46 parts of oxydianiline in 107 parts of glacial acetic acid under a nitrogen atmosphere. After the mixture was refluxed for 3 hours, it was allowed to cool to room temperature. There was obtained a crude product which was collected and washed twice with diethyl ether. The crude product was then dried in a vacuum oven at 65° C., resulting in a 98% yield of a yellow crystalline material, m.p. 228.5–229.5° C. Based on method of preparation and elemental analysis for $C_{28}H_{14}O_5N_2F_2$, the product was bis[4 - (3 - fluorophthalimide)phenyl] oxide. Calc.: C, 67.7; H, 2.8; N, 5.6. Found: C, 67.3; H, 2.9; N, 5.3.

The above mixture of the sodium salt of bisphenol-A and the above-described bis(fluorophthalimide) was stirred for about 6 hours at 70° C. The mixture was then allowed to cool to room temperature and about 0.1 part of acetic acid was added. The resulting solution was then added dropwise to 600 parts of methanol. A product precipitated which was collected by filtration, dried and redissolved in chloroform, and reprecipitated in methanol. After drying in a 65° C. vacuum oven, there was obtained a product having an intrinsic viscosity in dimethylformamide of 0.270. Based on method of preparation, the product was a polyetherimide consisting essentially of the following chemically combined units,

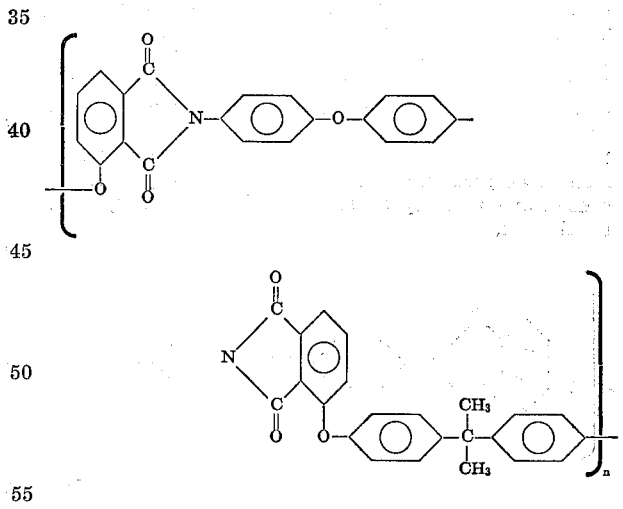

Example 3

The sodium salt of bisphenol-A was prepared as described in Example 1 from the reaction of 3.5691 parts of 50% aqueous sodium hydroxide and 5.0909 parts of bisphenol-A in a dimethylsulfoxide toluene mixture. The mixture was cooled to 70° C. and 6.8779 parts of 1,6-bis(3-fluorophthalimido)hexane was added, followed by rinsing with toluene.

The above 1,6-bis(3-fluorophthalimido)hexane is prepared by stirring a mixture of 16 parts of 3-fluorophthalic anhydride and 5.60 parts of hexamethylenediamine (HMDA) in 135 ml. of glacial acetic acid under a nitrogen atmosphere. After the mixture was refluxed for 3 hours it was cooled to room temperature. There was obtained a crude product which was collected and washed with diethyl ether. The crude product was then dried in a vacuum oven at 65° C. resulting in a 90% yield of material, m.p. 169.0–170.0° C. Based on method of preparation and elemental analysis for $C_{22}H_{18}O_4N_2F_2$. Calc: C, 64.1; H, 4.4; N, 6.8; Found: C, 64.2; H, 4.5; N, 6.7. The product was 1,6-bis(3-fluorophthalimido)hexane.

The above mixture of the sodium salt of bisphenol-A and the above-described bis(fluorophthalimide) was stirred for about 6 hours at 70° C. The mixture was then allowed to cool to room temperature and about 0.1 part of acetic acid was added dropwise. The resulting solution was then added dropwise to 600 parts of methanol. A product precipitated which was collected by filtration, dried and redissolved in chloroform, and reprecipitated in methanol. After drying in a 65° C. vacuum oven, there was obtained a product having an intrinsic viscosity in dimethylformamide of 0.176. Based on method of preparation, the product was a polyetherimide consisting essentially of the following chemically combined units

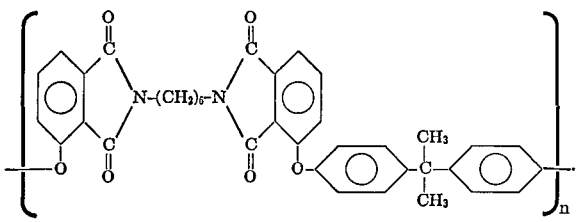

Example 4

In accordance with the procedure of Example 1, the sodium salt of bisphenol-A is prepared in dimethylsulfoxide/toluene. An equal molar amount of bis[4-(4'fluorophthalimide)phenyl]methane is added with stirring. The entire mixture is heated at 80° C. for 10 hours under a nitrogen atmosphere. The bis[4-(4-fluorophthalimide)phenyl]methane is prepared from appropriate amounts of 4-fluorophthalic anhydride and methylene dianiline. The mixture is cooled to room temperature and added dropwise to methanol. The resulting precipitate is collected by filtration, dried and redissolved in chloroform, and repreceipitated in methanol. After drying in 65° C. vacuum oven, there is obtained a product having an intrinsic viscosity of 0.23 in dimethylformamide. Based on method of preparation, the product is a polyetherimide consisting essentially of the following chemically combined units,

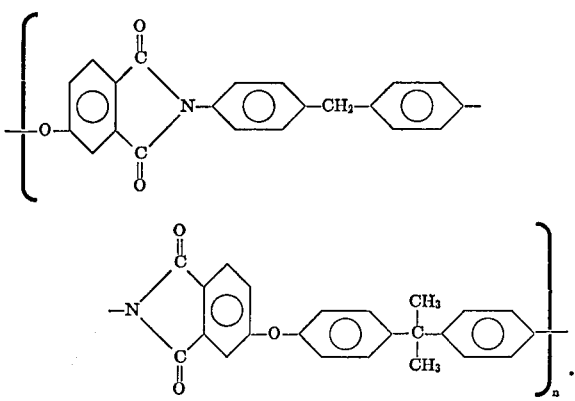

Example 5

Polyetherimide rate studies were made using bis(fluorophthalimide) and bis(chlorophthalimide) by measuring the changes in polyetherimide intrinsic viscosity after 3 hours, 6 hours and 16 hours in accordance with the procedure of Example 1. The following results were obtained, where "fluoro" indicates polymer made from the sodium salt of bisphenol-A and bis[4-(3-fluorophthalimide)phenyl]methane and "chloro" indicates polymer using bis[4 - (3 - chlorophthalimide)phenyl]methane, "time" is when a sample of the mixture was removed to measure "IV," intrinsic viscosity.

Fluoro:
Time, hours:                                  IV
    3 hours _____ .20
    6 hours _____ .207
    16 hours _____ .209
Chloro:
Time, hours:
    3 hours _____ 0.79
    6 hours _____ 0.99
    16 hours _____ .154

The above results clearly establish that the method of the present invention using bis(fluorophthalimide) to make polyetherimide is superior to using bis(chlorophthalimide).

Although the above examples are limited to only a few of the bis(fluorophthalimide)s and alkali metal diphenoxides which can be used in the practice of the invention to make the above described polyetherimides, it should be understood that the method of the present invention is directed to a much broader scope of such materials as illustrated by the alkali metal diphenoxides of formula II and the bis(fluorophthalimide)s of formula III. In addition to being employed as intermediates for making the polyetherimides of the present invention, the bis(fluorophthalimide)s of formula III also can be employed as plasticizers in a variety of organic polymers such as polyvinyl chloride, polyimides, polystyrene, etc.

What I claim as new and desire to secure by Letters Patent of the United States is:

1. A method for making polyetherimide consisting essentially of chemically combined units of the formula

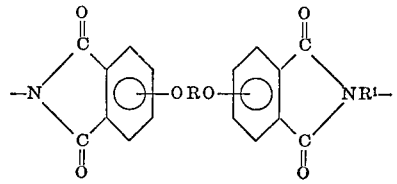

which comprises
(1) effecting reaction between substantially equal molar amounts of an alkali metal salt of a dihydric phenol of the formula,

MOROM, and a bisimide of the formula,

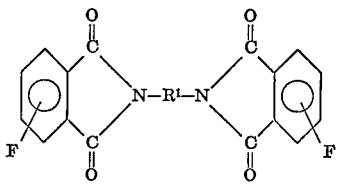

in the presence of a dipolar aprotic organic solvent at a temperature of up to about 100° C.,
(2) thereafter effecting the precipitation of the polyetherimide from the mixture of (1),
(3) and recovering the polyetherimide from the mixture of (2), where R is a divalent aromatic organic radical having from about 6–30 carbon atoms, $R^1$ is a divalent organic radical selected from the class consisting of (a) aromatic hydrocarbon radicals having from 6–20 carbon atoms and halogenated derivatives thereof, (b) alkylene radicals, $C_{(1-8)}$ alkylene terminated polydiorganosiloxane, cyclo-alykylene radicals having from 3–20 carbon atoms, and (c) divalent radicals included by the formula,

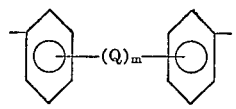

where Q is a member selected from the class consisting of

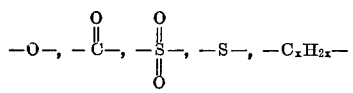

and $x$ is a whole number from 1 to 5 inclusive, $m$ is 0 or 1, and M is an alkali metal ion.

2. A method in accordance with claim 1, where the alkali metal salt of the dihydric phenol is the sodium salt of 2,2-bis(4-hydroxyphenyl)propane.

3. A method in accordance with claim 1, where the bisimide is bis[4-(3-fluorophthalimide)phenyl]methane.

4. A method in accordance with claim 1 where the bisimide is bis[4-(3-fluorophthalimide)phenyl]oxide.

References Cited
UNITED STATES PATENTS
3,699,075  10/1972  Lubowitz _____ 260—49

FOREIGN PATENTS
224,056  6/1968  U.S.S.R. _____ 260—47 CP
257,010  7/1970  U.S.S.R. _____ 260—47 CP

LESTER L. LEE, Primary Examiner

U.S. Cl. X.R.

260—61

UNITED STATES PATENT OFFICE
CERTIFICATE OF CORRECTION

Patent No. 3,847,869    Dated November 12, 1974

Inventor(s)    Frank J. Williams III

It is certified that error appears in the above-identified patent and that said Letters Patent are hereby corrected as shown below:

In the specification, Column 8, Line 8, cancel "0.79" and substitute -0.079-. Line 9, cancel "0.99" and substitute - 0.099 -.

Signed and sealed this 4th day of March 1975.

(SEAL)
Attest:

RUTH C. MASON
Attesting Officer

C. MARSHALL DANN
Commissioner of Patents
and Trademarks